(12) United States Patent
Terao et al.

(10) Patent No.: US 12,258,481 B2
(45) Date of Patent: Mar. 25, 2025

(54) DISPERSION LIQUID, INK COMPOSITION FOR INK JET RECORDING, AND DISPERSING RESIN

(71) Applicant: Seiko Epson Corporation, Tokyo (JP)

(72) Inventors: Koichi Terao, Suwa (JP); Mami Tojino, Shiojiri (JP); Toshihiro Otake, Chino (JP); Hiroshi Ito, Matsumoto (JP); Koji Horiba, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 713 days.

(21) Appl. No.: 17/529,320

(22) Filed: Nov. 18, 2021

(65) Prior Publication Data

US 2022/0154022 A1    May 19, 2022

(30) Foreign Application Priority Data

Nov. 19, 2020   (JP) .................. 2020-192340

(51) Int. Cl.
| | |
|---|---|
| *C09D 11/32* | (2014.01) |
| *C09D 11/033* | (2014.01) |
| *C09D 11/102* | (2014.01) |

(52) U.S. Cl.
CPC ............ *C09D 11/32* (2013.01); *C09D 11/033* (2013.01); *C09D 11/102* (2013.01)

(58) Field of Classification Search
CPC ..... C09D 11/033; C09D 11/107; C09D 11/32; C09D 11/328; C08F 22/04; C08F 22/06
See application file for complete search history.

(56) References Cited

U.S. PATENT DOCUMENTS

| | | | | |
|---|---|---|---|---|
| 4,923,634 A | * | 5/1990 | Hoots | ..................... C23F 11/08 |
| | | | | 252/389.2 |
| 2020/0255570 A1 | * | 8/2020 | Van Gaens | ........... C08F 226/02 |

FOREIGN PATENT DOCUMENTS

| | | |
|---|---|---|
| JP | 2015-048437 A | 3/2015 |
| JP | 2020-508844 A | 3/2020 |

* cited by examiner

*Primary Examiner* — Ana L. Woodward
(74) *Attorney, Agent, or Firm* — Harness, Dickey & Pierce, P.L.C.

(57) ABSTRACT

A dispersion liquid includes water, a coloring material, and a dispersing resin which disperses the coloring material, in which the dispersing resin has a predetermined constituent unit A, a predetermined constituent unit B, and a predetermined constituent unit C.

14 Claims, No Drawings

DISPERSION LIQUID, INK COMPOSITION FOR INK JET RECORDING, AND DISPERSING RESIN

The present application is based on, and claims priority from JP Application Serial Number 2020-192340, filed Nov. 19, 2020, the disclosure of which is hereby incorporated by reference herein in its entirety.

BACKGROUND

1. Technical Field

The present disclosure relates to a dispersion liquid, an ink composition for ink jet recording, and a dispersing resin.

2. Related Art

By ink jet recording methods, high-definition images can be recorded with relatively simple devices and the ink jet recording methods are being rapidly developed in various aspects. Among the above, various studies are being carried out on the dispersibility of coloring materials in inks.

Here, it is considered that one method for improving the dispersibility of coloring materials is to use a dispersant. For example, JP-A-2015-048437 discloses an ink which uses a styrene acrylic acid resin and/or a styrene maleic acid resin as a dispersant.

However, with the ink compositions including dispersants in the related art, such as the styrene-acrylic-based resin described in JP-A-2015-048437, there is a problem in that it is difficult to carry out redispersion after the ink has dried and the coloring material has solidified and defects are easily generated when the ink is re-discharged after drying.

SUMMARY

The present disclosure discloses a dispersion liquid including water, a coloring material, and a dispersing resin which disperses the coloring material, in which the dispersing resin has a constituent unit A represented by Formula (1), a constituent unit B represented by Formula (2), and a constituent unit C represented by any of Formulas (3-1) to (3-4),

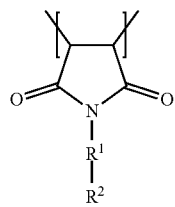
(1)

where $R^1$ independently represents a divalent organic group having 1 to 20 carbon atoms, and $R^2$ independently represents a sulfo group or a salt thereof,

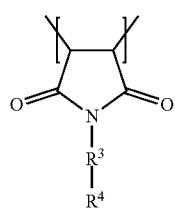
(2)

where $R^3$ independently represents a polyalkyleneoxy group, and $R^4$ independently represents an alkyl group having 1 to 3 carbon atoms, and

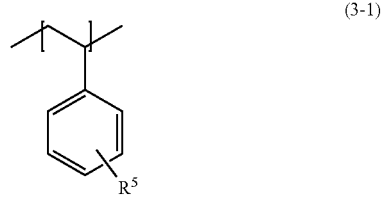
(3-1)

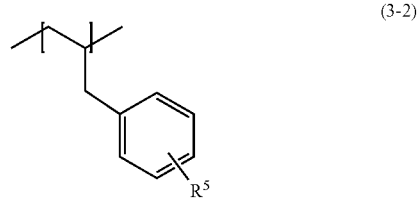
(3-2)

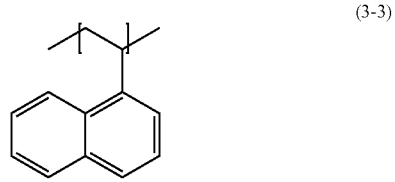
(3-3)

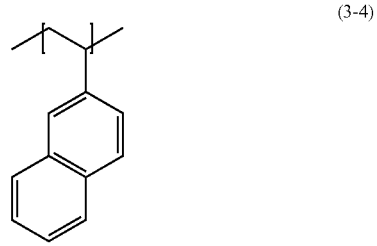
(3-4)

where $R^5$ independently represents a hydrogen atom, an alkyl group having 1 to 12 carbon atoms, or an alkoxy group having 1 to 12 carbon atoms.

In addition, the present disclosure is an ink composition for ink jet recording including the dispersion liquid described above, a surfactant, and a water-soluble organic solvent.

Furthermore, the present disclosure is a dispersing resin including a constituent unit A represented by Formula (1), a constituent unit B represented by Formula (2), and a constituent unit C represented by any of Formulas (3-1) to (3-4).

DESCRIPTION OF EXEMPLARY EMBODIMENTS

A detailed description will be given below of embodiments of the present disclosure (referred to below as "the present embodiments"); however, the present disclosure is not limited thereto, and various modifications are possible within a range not departing from the gist thereof.

1. Dispersion Liquid

The dispersion liquid of the present embodiment includes water, a coloring material, and a dispersing resin which disperses the coloring material, in which the dispersing resin has a constituent unit A represented by Formula (1), a constituent unit B represented by Formula (2), and a constituent unit C represented by any of Formulas (3-1) to (3-4),

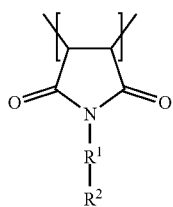

(1)

where $R^1$ independently represents a divalent organic group having 1 to 20 carbon atoms, and $R^2$ independently represents a sulfo group or a salt thereof,

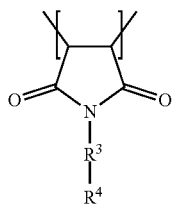

(2)

where $R^3$ independently represents a polyalkyleneoxy group, and $R^4$ independently represents an alkyl group having 1 to 3 carbon atoms, and

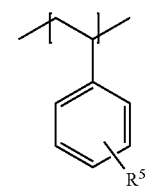

(3-1)

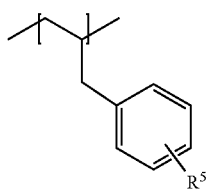

(3-2)

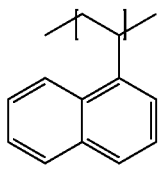

(3-3)

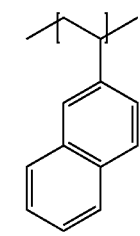

(3-4)

where $R^5$ independently represents a hydrogen atom, an alkyl group having 1 to 12 carbon atoms, or an alkoxy group having 1 to 12 carbon atoms.

Dispersion liquids or ink compositions using dispersing resins in the related art have a problem of redispersion being difficult once the coloring material has solidified. In contrast, in the present embodiment, using a dispersing resin having the configuration described above makes it possible to easily redisperse solidified coloring materials and, even in a case of being stored at high temperatures, there is little change in the particle size of the coloring material particles or the viscosity of the dispersion liquid and, due to this, it is possible to prevent clogging of the ink composition for ink jet recording that uses the dispersion liquid and to further improve the discharge stability thereof. A detailed description will be given below of each component.

1.1. Dispersing Resin

The dispersing resin has a constituent unit A represented by Formula (1), a constituent unit B represented by Formula (2), and a constituent unit C represented by any of Formulas (3-1) to (3-4) and, as necessary, may have a constituent unit D as described below. In the present embodiment, "constituent unit" refers to a repeating unit which constitutes a part of the dispersing resin after polymerization and "monomer" refers to a monomer having a polymerizable unsaturated bond before polymerization.

The dispersing resin may be a random copolymer, a block copolymer, or a graft copolymer. Examples of block copolymers include triblock copolymers having a block A formed of a constituent unit A, a block B formed of a constituent unit B, and a block C formed of a constituent unit C, as well as diblock copolymers having a block A formed of a constituent unit A and a random block B/C formed of constituent unit B and constituent unit C, and the like. In addition, examples of graft copolymers include a copolymer in which a constituent unit including maleic acid of a styrene maleic acid copolymer has been modified to be the constituent unit A. Using such a dispersing resin tends to further improve redispersibility after solidification and to further reduce changes in particle size and viscosity even in a case of being stored at high temperatures.

The content of the dispersing resin is preferably 2.5% to 12.5% by mass with respect to the total amount of the dispersion liquid, more preferably 3.5% to 10% by mass, and even more preferably 4.5% to 9.0% by mass. The content of the dispersing resin being within the above range tends to further improve the redispersibility after solidification and to further reduce changes in the particle size and viscosity even in a case of being stored at high temperatures.

In addition, the content of the dispersing resin is preferably 20 to 100 parts by mass with respect to 100 parts by mass of coloring material, more preferably 30 to 80 parts by mass, and even more preferably 40 to 70 parts by mass. The content of the dispersing resin being within the above range tends to further improve the redispersibility after solidification and to further reduce changes in the particle size and viscosity even in a case of being stored at high temperatures.

1.1.1. Constituent Unit A

The constituent unit A is a constituent unit represented by Formula (1). Monomers forming the constituent unit A may be used alone or in a combination of two or more.

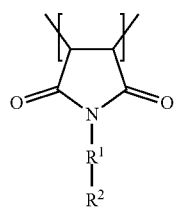

(1)

(Where $R^1$ independently represents a divalent organic group having 1 to 20 carbon atoms, and $R^2$ independently represents a sulfo group or a salt thereof)

In the formula, the divalent organic group having 1 to 20 carbon atoms represented by $R^1$ is not particularly limited, but examples thereof include a divalent aliphatic hydrocarbon group (alkylene group, cycloalkylene group, alkylene-cycloalkylene group, and the like), a divalent aromatic hydrocarbon group (arylene group, alkylene-arylene group, and the like), and the like.

Among the above, divalent aliphatic hydrocarbon groups are preferable and alkylene groups are more preferable. The alkylene groups are not particularly limited, but examples thereof include ethylene groups, propylene groups, isopropylene groups, butylene groups, 1,2-dimethylethylene groups, pentylene groups, 1-methylbutylene groups, 2-methylbutylene groups, heptylene groups, octylene groups, nonylene groups, and decylene groups.

In addition, the number of carbon atoms in the divalent organic group represented by $R^1$ is 1 to 20, preferably 1 to 12, and more preferably 1 to 8.

Salts of the sulfo group represented by $R^2$ are not particularly limited, but examples thereof include sodium salts, lithium salts, potassium salts, ammonium salts, and the like.

Among the above, the monomer forming the constituent unit A preferably includes one or more selected from the group consisting of N-methanesulfonate maleimide, N-ethanesulfonate maleimide, N-propanesulfonate maleimide, N-benzenesulfonate maleimide, and salts thereof. Using such a constituent unit A tends to further improve the redispersibility after solidification and to further reduce changes in the particle size and viscosity even in a case of being stored at high temperatures.

The content of the constituent unit A is preferably 5 to 55 mol % or more with respect to the total amount of the dispersing resin, more preferably 10 to 50 mol %, and even more preferably 10 to 45 mol %. The content of the constituent unit A being within the above range tends to further improve the redispersibility after solidification and to further reduce changes in the particle size and viscosity even in a case of being stored at high temperatures.

1.1.2. Constituent Unit B

The constituent unit B is a constituent unit represented by Formula (2). Monomers forming the constituent unit B may be used alone or in a combination of two or more.

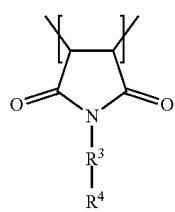

(2)

(Where $R^3$ independently represents a polyalkyleneoxy group, and $R^4$ independently represents an alkyl group having 1 to 3 carbon atoms)

In the formula, the polyalkyleneoxy group represented by $R^3$ is not particularly limited, but examples thereof include a polyethyleneoxy group, a polypropyleneoxy group, and a polyethyleneoxy-polypropyleneoxy group.

Among the above, a polyethyleneoxy-polypropyleneoxy group including an oxyethylene unit and an oxypropylene unit is preferable. Using such an $R^3$ tends to further improve the redispersibility after solidification and to further reduce changes in the particle size and viscosity even in a case of being stored at high temperatures.

In the polyethyleneoxy-polypropyleneoxy group, the repetition number ×1 of the ethyleneoxy units is preferably 5 to 60, more preferably 10 to 50, and even more preferably 15 to 40. The repetition number ×2 of propyleneoxy units is preferably 1 to 30, more preferably 1 to 20, and even more preferably 1 to 15. Furthermore, ×1+×2 is preferably 10 to 60, more preferably 15 to 50, and even more preferably 20 to 45. In addition, ×2/×1 is preferably 1.5 to 10, more preferably 2.0 to 8.0, and even more preferably 2.5 to 6.5. Using such a polyethyleneoxy-polypropyleneoxy group tends to further improve the redispersibility after solidification and to further reduce changes in the particle size and viscosity even in a case of being stored at high temperatures.

The alkyl group represented by $R^4$ is not particularly limited, but examples thereof include a methyl group, an ethyl group, and a propyl group.

The content of the constituent unit B is preferably 1 to 20 mol % or more with respect to the total amount of the dispersing resin, more preferably 3 to 15 mol %, and even more preferably 5 to 10 mol %. The content of the constituent unit B being within the above range tends to further improve the redispersibility after solidification and to further reduce changes in the particle size and viscosity even in a case of being stored at high temperatures.

1.1.3. Constituent Unit C

The constituent unit C is a constituent unit represented by any of Formulas (3-1) to (3-4). Monomers forming the constituent unit C may be used alone or in a combination of two or more.

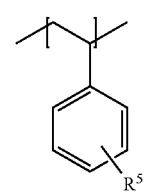

(3-1)

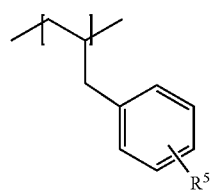

(3-2)

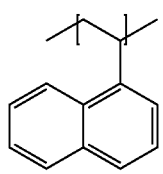

(3-3)

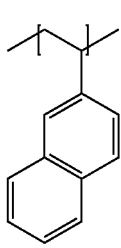

(3-4)

(Where $R^5$ independently represents a hydrogen atom, an alkyl group having 1 to 12 carbon atoms, or an alkoxy group having 1 to 12 carbon atoms)

As the alkyl group having 1 to 12 carbon atoms represented by $R^5$, it is possible to use a linear, branched-chain, or cyclic alkyl group. Such alkyl groups are not particularly limited, but examples thereof include methyl groups, ethyl groups, n-propyl groups, isopropyl groups, n-butyl groups, isobutyl groups, sec-butyl groups, t-butyl groups, n-pentyl groups, neopentyl groups, n-hexyl groups, cyclohexyl groups, n-heptyl groups, n-octyl groups, n-ethylhexyl groups, n-nonyl groups, and n-decyl groups.

The alkoxy group having 1 to 12 carbon atoms represented by $R^5$ is not particularly limited, but examples thereof include methoxy groups, ethoxy groups, propoxy groups, butoxy groups, pentyloxy groups, hexyloxy groups, octyloxy groups, decyloxy groups, dodecyloxy groups, hexadecyloxy groups, octadecyloxy groups, and the like.

The number of carbon atoms in the alkyl group or alkoxy group represented by $R^5$ is 1 to 12, preferably 1 to 6, and more preferably 1 to 3.

Among the above, the monomer forming the constituent unit C preferably includes one or more selected from the group consisting of styrene, allylbenzene, vinyltoluene, 1-vinylnaphthalene, and 2-vinylnaphthalene. Using such a constituent unit C tends to further improve the redispersibility after solidification and to further reduce changes in the particle size and viscosity even in a case of being stored at high temperatures.

The content of the constituent unit C is preferably 40 to 90 mol % with respect to the total amount of the dispersing resin, more preferably 45 to 85 mol %, and even more preferably 50 to 75 mol %. The content of the constituent unit C being within the above range tends to further improve the redispersibility after solidification and to further reduce changes in the particle size and viscosity even in a case of being stored at high temperatures.

1.1.4. Constituent Unit D

The dispersing resin may further have a constituent unit D represented by Formula (4). Having such a constituent unit D tends to further improve the redispersibility after solidification and to further reduce changes in the particle size and viscosity even in a case of being stored at high temperatures.

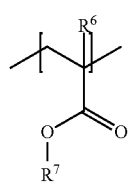

(4)

(Where $R^6$ independently represents a hydrogen atom or a methyl group, and $R^7$ independently represents a hydrogen atom or an alkyl group having 1 to 12 carbon atoms)

As the alkyl group having 1 to 12 carbon atoms represented by $R^7$, it is possible to use a linear, branched-chain, or cyclic alkyl group. Such alkyl groups are not particularly limited, but examples thereof include methyl groups, ethyl groups, n-propyl groups, isopropyl groups, n-butyl groups, isobutyl groups, sec-butyl groups, t-butyl groups, n-pentyl groups, neopentyl groups, n-hexyl groups, cyclohexyl groups, n-heptyl groups, n-octyl groups, n-ethylhexyl groups, n-nonyl groups, and n-decyl groups.

The number of carbon atoms in the alkyl group represented by $R^7$ is 1 to 12, preferably 1 to 10, and more preferably 1 to 8.

Among the above, it is preferable to include one or more selected from the group consisting of methyl acrylate, n-butyl acrylate, isobutyl acrylate, cyclohexyl acrylate, methyl methacrylate, n-butyl methacrylate, isobutyl methacrylate, and cyclohexyl methacrylate. Using such a constituent unit D tends to further improve the redispersibility after solidification and to further reduce changes in the particle size and viscosity even in a case of being stored at high temperatures.

The content of the constituent unit D is preferably 1 to 20 mol % with respect to the total amount of the dispersing resin, more preferably 3 to 15 mol %, and even more preferably 5 to 10 mol %. The content of the constituent unit D being within the above range tends to further improve the redispersibility after solidification and to further reduce changes in the particle size and viscosity even in a case of being stored at high temperatures.

1.1.5. Other Constituent Units

The dispersing resin of the present embodiment may have a constituent unit including maleic acid or a derivative thereof as a constituent unit other than the above constituent units.

1.1.6. Weight Average Molecular Weight

The weight average molecular weight of the dispersing resin is 10000 to 60000, preferably 12500 to 45000, and more preferably 15000 to 30000. The weight average molecular weight of the dispersing resin being within the above range tends to further improve the redispersibility after solidification and to further reduce changes in the particle size and viscosity even in a case of being stored at high temperatures.

It is possible to measure the weight average molecular weight by a chromatographic method by using known methods. More specifically, it is possible to carry out measurement by the method described in the Examples.

1.1.7. Manufacturing Method

It is possible to obtain the dispersing resin of the present embodiment by copolymerizing monomers forming each of the constituent units described above. The polymerization reaction is not particularly limited, but, for example, it is possible to use radical polymerization, in particular, living radical polymerization. In addition, the maleic acid-including constituent unit of the styrene maleic acid copolymer may be modified into constituent unit A (maleimide unit).

1.2. Water

The content of water is preferably 60% to 95% by mass with respect to the total amount of the dispersion liquid, more preferably 65% to 95% by mass, and even more preferably 75% to 90% by mass.

1.3. Coloring Material

The coloring material is not particularly limited, but examples thereof include disperse dyes and pigments.

Among the above, disperse dyes are preferable. Using disperse dyes tends to further improve the redispersibility after solidification and to further reduce changes in particle size and viscosity even in a case of being stored at high temperatures. Coloring materials may be used alone or in a combination of two or more.

The disperse dye is not particularly limited, but it is possible to use known dyes such as C.I. Disperse Yellow, C.I. Disperse Orange, C.I. Disperse Blue, C.I. Disperse Violet, and C.I. Disperse Black.

Inorganic pigments are not particularly limited, but examples thereof include carbon blacks (C.I. Pigment Black 7) such as furnace black, lamp black, acetylene black, and channel black, iron oxide, and titanium oxide.

Organic pigments are not particularly limited, but examples thereof include quinacridone-based pigments, quinacridonequinone-based pigments, dioxazine-based pigments, phthalocyanine-based pigments, anthrapyrimidine-based pigments, ansanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, azo-based pigments, and the like.

The content of the coloring material is preferably 7.5% to 30% by mass with respect to the total amount of the dispersion liquid, more preferably 7.5% to 25% by mass, and even more preferably 8.5% to 20% by mass.

1.4. pH Adjuster

The dispersion liquid may further include a pH adjuster. The pH adjuster is not particularly limited, but examples thereof include inorganic acids (for example, sulfuric acid, hydrochloric acid, nitric acid, and the like), inorganic bases (for example, lithium hydroxide, sodium hydroxide, potassium hydroxide, ammonia, and the like), organic bases (triethanolamine, diethanolamine, monoethanolamine, and tripropanolamine), and organic acids (for example, adipic acid, citric acid, succinic acid, and the like), and the like. One type of pH adjuster may be used alone, or a mixture of two or more types may be used.

2. Ink Composition for Ink Jet Recording

The ink composition for ink jet recording (also referred to simply as the "ink composition") of the present embodiment includes the dispersion liquid described above, a surfactant, and a water-soluble organic solvent, and may include other components as necessary. The expression "for ink jet recording" means for use in an ink jet method in which ink droplets are discharged from the nozzle of an ink jet head.

2.1. Dispersion Liquid

The dispersion liquid is as described above. The content of the dispersing resin included by the dispersion liquid included by the ink composition is preferably 0.1% to 3.5% by mass with respect to the total amount of the ink composition, more preferably 0.3% to 3.0% by mass, and even more preferably 0.5% to 2.5% by mass. The content of the dispersing resin being within the above range tends to further improve the redispersibility after solidification and to further reduce changes in the particle size and viscosity even in a case of being stored at high temperatures.

The content of the coloring material included by the dispersion liquid included by the ink composition is preferably 0.5% to 7.0% by mass with respect to the total amount of the ink composition, more preferably 1.0% to 6.0% by mass, and even more preferably 1.5% to 4.5% by mass. The content of the coloring material being within the above range tends to further improve the redispersibility after solidification and to further reduce changes in the particle size and viscosity even in a case of being stored at high temperatures.

In the ink composition, the content of the dispersing resin is preferably 20 to 100 parts by mass with respect to 100 parts by mass of the coloring material, more preferably 30 to 80 parts by mass, and even more preferably 40 to 70 parts by mass. The content of the dispersing resin being within the above range tends to further improve the redispersibility after solidification and to further reduce changes in the particle size and viscosity even in a case of being stored at high temperatures.

2.2. Surfactant

The surfactant is not particularly limited, but examples thereof include acetylene glycol-based surfactants, fluorine-based surfactants, and silicone-based surfactants.

Acetylene glycol-based surfactants are not particularly limited, but one or more selected from, for example, 2,4,7,9-tetramethyl-5-decyn-4,7-diol and alkylene oxide adducts of 2,4,7,9-tetramethyl-5-decyn-4,7-diol, and 2,4-dimethyl-5-decyn-4-ol and alkylene oxide adducts of 2,4-dimethyl-5-decyn-4-ol are preferable.

Fluorine-based surfactants are not particularly limited, but examples thereof include perfluoroalkyl sulfonates, perfluoroalkyl carboxylates, perfluoroalkyl phosphoric acid esters, perfluoroalkyl ethylene oxide adducts, perfluoroalkyl betaines, and perfluoroalkyl amine oxide compounds.

Silicone-based surfactants include polysiloxane-based compounds, polyether-modified organosiloxanes, and the like.

The content of the surfactant is preferably 0.1% to 3.0% by mass with respect to the total amount of the ink composition, and more preferably 0.1% to 1.0% by mass.

2.3. Water-Soluble Organic Solvent

The water-soluble organic solvent is not particularly limited, but examples thereof include glycerol; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; glycol mono ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, and triethylene glycol monomethyl ether; nitrogen-containing solvents such as 2-pyrrolidone, N-methyl-2-pyrrolidone, and N-ethyl-2-pyrrolidone; alcohols such as methanol, ethanol, n-propyl alcohol, isopropyl alcohol, n-butanol, 2-butanol, tert-butanol, isobutanol, n-pentanol, 2-pentanol, 3-pentanol, and tert-pentanol. Among the above, glycerol, glycols, and glycol monoethers are preferable and diethylene glycol, propylene glycol, triethylene glycol monomethyl ether and glycerol are more preferable. Water-soluble organic solvents may be used alone, or in combination of two or more.

The content of the water-soluble organic solvent is preferably 5.0% to 30% by mass with respect to the total amount of the ink composition, and more preferably 10% to 20% by mass. The content of the water-soluble organic solvent being within the above range tends to further improve the redispersibility after solidification and to further reduce changes in the particle size and viscosity even in a case of being stored at high temperatures.

2.4. Water

The water content is preferably 60% to 90% by mass with respect to the total amount of the ink composition, and more preferably 70% to 85% by mass. The content of the water being within the above range tends to further improve the redispersibility after solidification and to further reduce changes in the particle size and viscosity even in a case of being stored at high temperatures.

2.5. pH Adjuster

The ink composition may further include a pH adjuster. The pH adjuster is not particularly limited, but examples thereof include any examples illustrated in the dispersion liquid. The pH adjuster in the ink composition may be derived from and mixed with the dispersion liquid, or may be added separately when the ink composition is adjusted.

The content of the pH adjuster is preferably 0.1% to 2.0% by mass with respect to the total amount of the ink composition, and more preferably 0.5% to 1.5% by mass.

2.6. Other Resins

The ink composition may further include resins other than the dispersing resin. The other resins are not particularly limited, but examples thereof include anionic resins, cationic resins, or nonionic resins. Including such resins makes it possible for the coloring material to adhere to the recording medium.

The cationic resins are not particularly limited, but examples thereof include starch derivatives such as cationic starch, cationic urethane resins, cationic olefin resins, and cationic allylamine resins.

Examples of anionic resins include carboxymethyl cellulose salts, cellulose derivatives such as viscose, and natural resins such as alginate, gum arabic, tragacanth gum, and lignin sulfonate.

Nonionic resins are not particularly limited, but examples thereof include acrylic-based resins, styrene-acrylic-based resins, urethane-based resins, ester-based resins, olefin-based resins, and vinyl acetate-based resins.

The content of the other resins is preferably 0.1% to 2.0% by mass with respect to the total amount of the ink composition, and more preferably 0.5% to 1.5% by mass.

EXAMPLES

A more detailed description will be given of the present disclosure using Examples and Comparative Examples. The present disclosure is not limited in any way by the following Examples.

1. Synthesis Examples 1.1. Synthesis of Monomer 1.1.1. Synthesis Example 1

8.8 g of aminomethanesulfonate (Tokyo Chemical Industry Co., Ltd., 80 mmol), 7.84 g of maleic anhydride (Fujifilm Wako Pure Chemical Corporation, 80 mmol), and 300 mL of acetic acid (Fujifilm Wako Pure Chemical Corporation) were placed into a three-necked flask provided with a reflux cooling tube and a thermometer and, the mixture was stirred using a magnetic stirrer for 15 hours at room temperature in an air atmosphere and then heated and refluxed for 8 hours. After the acetic acid was distilled off under reduced pressure, impurities were separated by silica gel column chromatography and recrystallized to obtain N-methanesulfonate maleimide (a-1) (8.5 g, 55.6% yield) represented by the following formula. Identification of the compound was performed by proton nuclear magnetic resonance spectroscopy.

1H-NMR (400 MHz, DMSO-d6) δ (ppm)=7.64 (1H, s, SO$_3$H), 6.75 (2H, s, 2×CH), 3.58 (2H, s, CH$_2$)

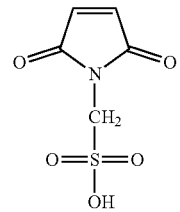

1.1.2. Synthesis Example 2

N-propanesulfonate maleimide (a-2) was obtained by the same operation as in Synthesis Example 1, except that 3-aminopropanesulfonate was used instead of aminomethanesulfonate.

1.1.3. Synthesis Example 3

N-ethanesulfonate maleimide (a-3) was obtained by the same operation as in Synthesis Example 1 except that 2-aminoethanesulfonate sodium salt was used instead of aminomethanesulfonate.

1.1.4. Synthesis Example 4

N-benzenesulfonate maleimide (a-4) was obtained by the same operation as in Synthesis Example 1 except that p-aminobenzenesulfonate sodium salt was used instead of aminomethanesulfonate.

Table 1 below illustrates $R^1$ and $R^2$ in Formula (1) of the monomer forming the constituent unit A obtained by Synthesis Examples 1 to 4 described above.

TABLE 1

| | | $R^1$ | $R^2$ |
|---|---|---|---|
| Synthesis Example 1 | a-1 | —CH$_2$— | SO$_3$H |
| Synthesis Example 2 | a-2 | —C$_3$H$_6$— | SO$_3$H |
| Synthesis Example 3 | a-3 | —C$_2$H$_4$— | SO$_3$Na |
| Synthesis Example 4 | a-4 | —C$_6$H$_4$— | SO$_3$Na |

1.1.5. Synthesis Example 5

N-maleimide monomer (b-1) was obtained by the same operation as in Synthesis Example 1 except that JEFFAMINE-M1000 (manufactured by Huntsman) was used instead of aminomethanesulfonate.

1.1.6. Synthesis Example 6

N-maleimide monomer (b-2) was obtained by the same operation as in Synthesis Example 1 except that JEFFAMINE-M2070 (manufactured by Huntsman) was used instead of aminomethanesulfonate.

1.1.7. Synthesis Example 7

N-maleimide monomer (b-3) was obtained by the same operation as in Synthesis Example 1 except that Genamin M41/2000 (manufactured by Clariant Japan) was used instead of aminomethanesulfonate.

Table 2 below illustrates $R^3$ and $R^4$ in Formula (2) of the monomer forming the constituent unit B obtained by Synthesis Examples 5 to 7 described above.

TABLE 2

|  |  | $R^3$ | $R^4$ |
|---|---|---|---|
| Synthesis Example 5 | b-1 | —(CHCH3CH2O)$_3$(C2H4O)$_{19}$— | CH$_3$ |
| Synthesis Example 6 | b-2 | —(CHCH3CH2O)$_{10}$(C2H4O)$_{31}$— | CH$_3$ |
| Synthesis Example 7 | b-3 | —(CHCH3CH2O)$_6$(C2H4O)$_{35}$— | CH$_3$ |

1.2. Copolymer Synthesis

1.2.1. Synthesis Example 8

5.74 g (30 mmol) of N-methanesulfonate maleimide (a-1) which imparts constituent unit A, 11.0 g (10 mmol) of N-maleimide monomer (b-1) which imparts constituent unit B, 10.4 g of styrene (manufactured by Tokyo Chemical Industry Co., Ltd., 100 mmol) as a monomer which imparts constituent unit C, and 60 g of dimethylsulfoxide (DMSO) (manufactured by Tokyo Chemical Industry Co., Ltd.) were placed into a three-necked flask provided with a reflux cooling tube and a thermometer and dissolved using a magnetic stirrer. In addition, 0.46 g of azobisisobutyronitrile (manufactured by Fujifilm Wako Pure Chemical Corporation, 2.8 mmol) were placed in another glass bottle and dissolved with 20 g of DMSO to make an initiator solution. After substituting the inside of the reactor with nitrogen, the initiator solution was added dropwise into the reactor. Then, a reaction was carried out at 75° C. for 5 hours. After completion of the reaction, the reactant was added dropwise into water and a white solid was precipitated. After suction filtration of the white solid, the result was washed repeatedly with water and vacuum dried at 50° C. for 10 hours to obtain 13.2 g of copolymer A-1.

1.2.2. Synthesis Examples 9 to 14

Copolymers A-2 to A-7 were obtained in the same manner as in Synthesis Example 8, except that the monomers listed in Table 3 were used and the use amounts of the monomer and initiator were adjusted.

1.2.3. Synthesis Example 15

8.32 g of styrene (manufactured by Tokyo Chemical Industry Co., Ltd., 80 mmol) as a monomer which imparts constituent unit C, 2-{[(carboxymethyl)sulfanylthiocarbonyl]sulfanyl}propanoic acid (CSPA) (manufactured by Tokyo Chemical Industry Co., Ltd., 9.6 mmol), 0.52 g of azobisisobutyronitrile (manufactured by Fujifilm Wako Pure Chemical Corporation, 3.2 mmol), and 80 g of dimethylformamide (DMF) (manufactured by Tokyo Chemical Industry Co., Ltd.) were placed into a three-necked flask provided with a reflux cooling tube and a thermometer and dissolved using a magnetic stirrer. After a degassing operation by nitrogen bubbling, the result was heated at 75° C. for 6 hours. After completion of the reaction, the reactant was added dropwise into water to precipitate a pale-yellow solid. The obtained solid was separated by filtering, washed with a small amount of methanol, and vacuum dried at 50° C. for 10 hours to obtain a polystyrene Raft agent adduct (mb-1).

Next, the polystyrene Raft agent adduct (mb-1), 5.74 g (30 mmol) of an N-methanesulfonate maleimide (a-1) which imparts constituent unit A, 11.0 g (10 mmol) of an N-maleimide monomer (b-1) which imparts constituent unit B, 10.4 g of styrene (manufactured by Tokyo Chemical Industry Co., Ltd., 100 mmol) as monomer which imparts constituent unit C, 0.52 g of azobisisobutyronitrile (manufactured by Fujifilm Wako Pure Chemical Corporation, 3.2 mmol), and 60 g of DMF (manufactured by Tokyo Chemical Industry Co., Ltd.) were placed into a three-necked flask provided with a reflux cooling tube and a thermometer and dissolved using a magnetic stirrer. After a degassing operation by nitrogen bubbling, the result was heated at 75° C. for 6 hours. After completion of the reaction, the reaction solution was diluted with methanol and added to methyl ethyl ketone to precipitate a pale-yellow solid. The obtained solid was recovered by centrifugation and vacuum dried at 50° C. for 10 hours to obtain 19.5 g of copolymer B-1.

The obtained copolymer B-1 was a block copolymer having a block of constituent unit C and a random block of constituent units A, B, and C.

1.2.4. Synthesis Example 16

The copolymer B-2 was obtained in the same manner as in Synthesis Example 15, except that the monomer listed in Table 3 was used as the monomer which imparts the constituent unit A and the use amount of the monomer was adjusted.

1.2.5. Synthesis Example 17

In a three-necked flask provided with a reflux cooling tube and a thermometer, an aqueous solution (4.31 g) of 10 wt % sodium hydroxide of 1.35 g of 2-aminoethanesulfonate (manufactured by Tokyo Chemical Industry Co., Ltd.) which imparts constituent unit A and 5.0 g of JEFFAMINE-M1000 (manufactured by Huntsman Co., Ltd.) which imparts constituent unit B were added to a methyl ethyl ketone (25 mL) solution of 7.5 g of styrene maleic anhydride copolymer including constituent unit C (SMA EF60, styrene/maleic anhydride ratio: 6/1, manufactured by Kawahara Petrochemical Co., Ltd.) and the result was heated at 100° C. while stirring for 1 hour under a nitrogen flow. Once cooled, a distillation apparatus was attached thereto and methyl ethyl ketone and water were removed by distillation to obtain a pale-yellow solid. To this pale-yellow solid, 6.0 g of N-methylpyrrolidone (manufactured by Tokyo Chemical Industry Co., Ltd.) was added and the result was heated at 180° C. while stirring for 2.5 hours under an N2 flow. After cooling, a resulting yellow liquid was added to isopropyl alcohol (500 ml), the precipitated solid was separated by filtering, washed with a small amount of isopropyl alcohol, and vacuum dried at 50° C. for 10 hours to obtain 13.0 g of copolymer C-1.

1.2.6. Synthesis Examples 18 and 19

Copolymers C-2 and C-3 were obtained in the same manner as Synthesis Example 17 except that, in Synthesis Example 18, styrene maleic anhydride copolymer (SMA EF40, styrene/maleic anhydride ratio: 4/1) was used instead of styrene maleic anhydride copolymer (SMA EF60), and, in Synthesis Example 19, 4-aminobenzenesulfonate was used instead of 2-aminoethanesulfonate which imparts the constituent unit A, and styrene maleic anhydride copolymer (SMA 3000, styrene/maleic anhydride ratio: 3/1) was used instead of styrene maleic anhydride copolymer (SMA EF60).

1.2.7. Synthesis Examples 20 and 21

Copolymers D-1 and D-2 were obtained in the same manner as in Synthesis Example 8, except that the monomers listed in Table 3 were further used as monomers which impart the constituent unit D, and the use amounts of the monomer and initiator were adjusted.

1.2.8. Synthesis Examples 22 and 23

Copolymers E-1 and E-2 were obtained in the same manner as in Synthesis Examples 15 and 16, except that the monomers listed in Table 3 were further used as monomers which impart the constituent unit D in addition to constituent unit A, constituent unit B, and constituent unit C in the polystyrene Raft agent adduct (mb-1) and the use amounts of the monomer and initiator were adjusted. The obtained copolymers E-1 and E-2 were block copolymers having a block of constituent unit B and a random block of constituent units A, B, C, and D.

1.2.9. Synthesis Example 24

6.77 g of styrene (manufactured by Tokyo Chemical Industry Co., Ltd., 65 mmol) as the monomer which imparts the constituent unit C, 1.50 g of methyl methacrylate (manufactured by Tokyo Chemical Industry Co., Ltd., 15 mmol) as the monomer which imparts the constituent unit D, and DMSO (manufactured by Tokyo Chemical Industry Co., Ltd., 80 g) were placed into a three-necked flask provided with a reflux cooling tube and a thermometer and dissolved using a magnetic stirrer. In addition, 1.96 g of maleic anhydride (manufactured by Tokyo Chemical Industry Co., Ltd., 20 mmol) and 0.52 g of azobisisobutyronitrile (manufactured by Fujifilm Wako Pure Chemical Corporation, 3.2 mmol) were placed into another glass bottle and dissolved with 25 g of DMSO to obtain an initiator mixture solution. After substituting the inside of the reactor with nitrogen, the initiator mixture solution was added dropwise therein. Then, a reaction was carried out at 75° C. for 6 hours. After completion of the reaction, the reactant was added dropwise into water and a white solid was precipitated. After suction filtration of the white solid, the result was washed repeatedly with water and vacuum dried at 50° C. for 10 hours to obtain 8.7 g of copolymer (f-1).

Next, in a three-necked flask provided with a reflux cooling tube and a thermometer, an aqueous solution in which 2.5 g of 2-aminoethanesulfonate (manufactured by Tokyo Chemical Industry Co., Ltd., 20 mmol) which imparts the constituent unit A was dissolved in an aqueous solution (8.0 g) of 10 wt % sodium hydroxide was added to a methyl ethyl ketone (25 mL) solution of 8.0 g of the obtained copolymer (f-1, styrene/maleic anhydride/methyl methacrylate ratio: 13/4/3) and the result was heated at 100° C. while stirring for 1 hour under a nitrogen flow. Once cooled, a distillation apparatus was attached thereto and methyl ethyl ketone and water were removed by distillation to obtain a pale-yellow solid. To this pale-yellow solid, 20 g of Genamin M41/2000 (manufactured by Clariant Japan) which imparts constituent unit B was added and the result was heated at 180° C. while stirring for 3.0 hours under nitrogen flow to obtain 28.0 g of copolymer F-1.

1.2.10. Synthesis Examples 25 to 27

In Synthesis Examples 25 and 26, copolymers F-2 and F-3 were obtained in the same manner as in Synthesis Example 24, except that the monomers listed in Table 3 were used as monomers which impart the constituent unit D and the use amounts of the monomer and initiator were adjusted. In addition, the copolymer F-4 was obtained in the same manner as in Synthesis Example 24, except that, in Synthesis Example 27, 4-aminobenzenesulfonate was used instead of 2-aminoethanesulfonate which imparts the constituent unit A and the use amounts of the monomer and initiator were adjusted.

Table 3 illustrates the weight average molecular weight Mw of each copolymer obtained by the above Synthesis Examples and the composition ratio of each constituent unit.

TABLE 3

| Copolymer synthesis | | Constituent unit A | | Constituent unit B | | Constituent unit C | | Constituent unit D | | | |
|---|---|---|---|---|---|---|---|---|---|---|---|
| | Copolymer No. | Type | mol % | Type | mol % | Type | mol % | Type | mol % | Mw | Polymer form |
| Synthesis Example 8 | A-1 | a-1 | 20 | b-1 | 10 | Styrene | 70 | — | — | 18,000 | Random |
| Synthesis Example 9 | A-2 | a-1 | 40 | b-1 | 10 | 4-Vinyltoluene | 50 | — | — | 21,000 | Random |
| Synthesis Example 10 | A-3 | a-1 | 30 | b-1 | 10 | Allylbenzene | 60 | — | — | 20,000 | Random |
| Synthesis Example 11 | A-4 | a-1 | 45 | b-1 | 10 | 1-Vinylnapthalene | 45 | — | — | 30,000 | Random |
| Synthesis Example 12 | A-5 | a-1 | 45 | b-1 | 10 | 2-Vinylnapthalene | 45 | — | — | 15,000 | Random |
| Synthesis Example 13 | A-6 | a-4 | 40 | b-1 | 10 | 1-Vinylnapthalene | 50 | — | — | 18,000 | Random |
| Synthesis Example 14 | A-7 | a-2 | 30 | b-1 | 10 | 4-Vinyltoluene | 60 | — | — | 16,000 | Random |
| Synthesis Example 15 | B-1 | a-1 | 25 | b-1 | 5 | Styrene | 70 | — | — | 25,000 | Block |
| Synthesis Example 16 | B-2 | a-2 | 35 | b-1 | 5 | Styrene | 60 | — | — | 26,500 | Block |
| Synthesis Example 17 | C-1 | a-3 | 10 | b-1 | 5 | Styrene | 85 | — | — | 24,000 | Graft |
| Synthesis Example 18 | C-2 | a-3 | 15 | b-1 | 5 | Styrene | 80 | — | — | 25,000 | Graft |
| Synthesis Example 19 | C-3 | a-4 | 20 | b-1 | 5 | Styrene | 75 | — | — | 27,000 | Graft |
| Synthesis Example 20 | D-1 | a-1 | 25 | b-2 | 5 | Styrene | 60 | n-Butyl acrylate | 10 | 22,000 | Random |
| Synthesis Example 21 | D-2 | a-1 | 30 | b-2 | 10 | Styrene | 50 | Isobutyl methacrylate | 10 | 20,000 | Random |
| Synthesis Example 22 | E-1 | a-1 | 25 | b-2 | 5 | Styrene | 65 | n-Butyl acrylate | 5 | 18,000 | Block |
| Synthesis Example 23 | E-2 | a-2 | 20 | b-2 | 10 | Styrene | 65 | Isobutyl acrylate | 5 | 20,000 | Block |

TABLE 3-continued

| Copolymer synthesis | Copolymer No. | Constituent unit A | | Constituent unit B | | Constituent unit C | | Constituent unit D | | | Polymer form |
|---|---|---|---|---|---|---|---|---|---|---|---|
| | | Type | mol % | Type | mol % | Type | mol % | Type | mol % | Mw | |
| Synthesis Example 24 | F-1 | a-3 | 15 | b-3 | 5 | Styrene | 65 | Methyl methacrylate | 15 | 16,000 | Graft |
| Synthesis Example 25 | F-2 | a-3 | 25 | b-3 | 5 | Styrene | 60 | Isobutyl methacrylate | 10 | 18,000 | Graft |
| Synthesis Example 26 | F-3 | a-3 | 25 | b-3 | 5 | Styrene | 60 | Cyclohexyl methacrylate | 10 | 17,500 | Graft |
| Synthesis Example 27 | F-4 | a-4 | 15 | b-3 | 5 | Styrene | 70 | Methyl methacrylate | 10 | 22,000 | Graft |

1.3. NMR Analysis

The composition ratio of each constituent unit was confirmed by 1H-NMR analysis and 13C-NMR analysis. In the NMR analysis, a nuclear magnetic resonance apparatus (manufactured by JEOL Ltd., JNM-ECX400) was used.

1.4. Weight Average Molecular Weight

The weight average molecular weight Mw of each dispersing resin was measured by the chromatographic method. The conditions are given below.
(Measurement Conditions)
  Apparatus name: HLC8320GPC (Tosoh Corporation)
  Guard column: TSKgel Guard Column SuperAWM-H
  Column: TSKgel SuperAWM-H
  Column temperature: 25° C.
  Eluent: 10 mmol/L lithium bromide dimethylacetamide solution
  Flow rate: 0.6 mL/min
  Detector: RI 2. Preparation of Dispersion Liquids (Examples 1 to 20 and Comparative Examples 1 and 2)

A 1 L eggplant-type flask (stirrer, Dimroth cooling tube) was set, 15 parts by mass of the copolymers listed in Table 4 and 70 parts by mass of pure water were added thereto, and the results were heated to 80° C. while stirring. Here, triethanolamine was added until the pH was 8.0 and set to 100 parts by mass with pure water. After cooling to 25° C., the dissolved aqueous solution was used as the varnish solution.

Next, zirconia beads, 13 parts by mass of the varnish solution, 4 parts by mass of DISPERSE YELLOW 232 (also referred to below as "D.Y. 232") or DISPERSE RED 60 (also referred to below as "D.R. 60") as a non-water-soluble coloring material, and 17 parts by mass of pure water were added thereto and ground in a bead mill for 1 hour to prepare dispersion liquids including 5.7% by mass of the copolymer and 11.7% by mass of the coloring material.

3. Preparation of Ink Compositions

Each ink composition was obtained by mixing the dispersion liquids obtained as described above with other components to have the following compositions.

Dispersion Liquid:
  15.0% by mass
Organic Solvent:
  Diethylene glycol 10.0% by mass
  1,2-hexanediol 3.0% by mass
Other Resins:
  Carboxymethyl cellulose sodium salt 1.0% by mass
Surfactant:
  BYK-348 0.3% by mass
pH Adjuster:
  Triethanolamine 1.0% by mass
Water:
  Remainder 4. Evaluation 4.1. Particle Size Distribution Change The ink compositions prepared as described above were placed in a sample bottle and left at 60° C. for 5 days. Then, the volume-based cumulative 50% particle size (D50) of the ink compositions before and after being left to stand was measured by the dynamic light scattering method and the change in the cumulative 50% particle size before and after being left to stand was confirmed. The Microtrac UPA150 (manufactured by Microtrac Inc., trade name) was used as the measurement apparatus. The change in particle size distribution was determined based on the obtained measurement results.
(Evaluation Criteria)
  A: An increase in the cumulative 50% particle size of less than 10%.
  B: An increase in the cumulative 50% particle size of 10% or more and less than 30%.
  C: An increase in the cumulative 50% particle size of 30% or more.

4.2. Redispersibility

The ink compositions prepared as described above were added dropwise onto a glass slide and solidified by drying in a dryer at 40° C. for 16 hours. Then, the glass slide was immersed in a sample bottle containing ink water and the redispersion behavior of the solids was visually confirmed. The operation was carefully performed so as not to, for example, stir the ink water. Ink water is defined as that which does not include the dispersion liquid in the composition of the above ink composition. The evaluation criteria for redispersibility are given below.

(Evaluation Criteria)

A: Solids disappeared and redispersion was carried out.

B: Some solids remained, but redispersion was observed.

C: Solids remained and no redispersion was observed.

TABLE 4

|  | Copolymer | Coloring material | Particle size distribution change | Redispersibility |
|---|---|---|---|---|
| Example 1 | Copolymer A-1 | D.Y.232 | A | A |
| Example 2 | Copolymer A-2 | D.Y.232 | A | A |
| Example 3 | Copolymer A-3 | D.Y.232 | A | A |
| Example 4 | Copolymer A-4 | D.Y.232 | A | A |
| Example 5 | Copolymer A-5 | D.Y.232 | A | A |
| Example 6 | Copolymer A-6 | D.Y.232 | A | A |
| Example 7 | Copolymer A-7 | D.Y.232 | A | A |
| Example 8 | Copolymer B-1 | D.Y.232 | A | A |
| Example 9 | Copolymer B-2 | D.Y.232 | A | A |
| Example 10 | Copolymer C-1 | D.Y.232 | A | A |
| Example 11 | Copolymer C-2 | D.Y.232 | A | A |
| Example 12 | Copolymer C-3 | D.Y.232 | A | A |
| Example 13 | Copolymer D-1 | D.R.60 | A | A |
| Example 14 | Copolymer D-2 | D.R.60 | A | A |
| Example 15 | Copolymer E-1 | D.R.60 | A | A |
| Example 16 | Copolymer E-2 | D.R.60 | A | A |
| Example 17 | Copolymer F-1 | D.R.60 | A | A |
| Example 18 | Copolymer F-2 | D.R.60 | A | A |
| Example 19 | Copolymer F-3 | D.R.60 | A | A |
| Example 20 | Copolymer F-4 | D.R.60 | A | A |
| Comparative Example 1 | JONCRYL 61J | D.Y.232 | C | B |
| Comparative Example 2 | SMA1440F | D.R.60 | C | C |

*JONCRYL 61J (water-soluble styrene acrylic resin manufactured by BASF Japan)
*SMA1440F (esterified styrene maleic anhydride resin manufactured by Kawahara Petrochemical Co., Ltd.)

What is claimed is:

1. A dispersion liquid comprising:

water;

a coloring material; and a dispersing resin which disperses the coloring material, wherein the dispersing resin has a constituent unit A represented by Formula (1), a constituent unit B represented by Formula (2), and a constituent unit C represented by any of Formulas (3-1) to (3-4),

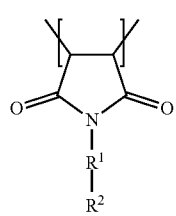

(1)

where $R^1$ independently represents a divalent organic group having 1 to 20 carbon atoms, and $R^2$ independently represents a sulfo group or a salt thereof,

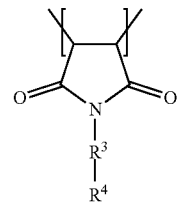

(2)

where $R^3$ independently represents a polyalkyleneoxy group, and $R^4$ independently represents an alkyl group having 1 to 3 carbon atoms, and

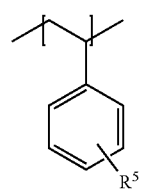

(3-1)

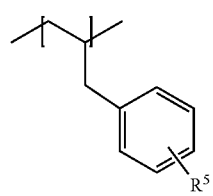

(3-2)

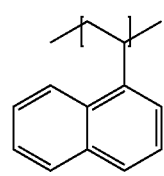

(3-3)

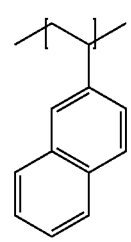

(3-4)

where $R^5$ independently represents a hydrogen atom, an alkyl group having 1 to 12 carbon atoms, or an alkoxy group having 1 to 12 carbon atoms.

2. The dispersion liquid according to claim 1, wherein a content of the constituent unit A is 5 to 55 mol % with respect to a total amount of the dispersing resin.

3. The dispersion liquid according to claim 1, wherein a content of the constituent unit B is 1 to 20 mol % with respect to a total amount of the dispersing resin.

4. The dispersion liquid according to claim 1, wherein a content of the constituent unit C is 40 to 90 mol % with respect to a total amount of the dispersing resin.

5. The dispersion liquid according to claim 4, wherein the content of the constituent unit C is 50 to 75 mol % with respect to the total amount of the dispersing resin.

6. The dispersion liquid according to claim 1, wherein the dispersing resin further has a constituent unit D represented by Formula (4), (4)

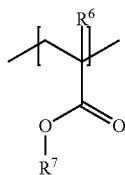

where R⁶ independently represents a hydrogen atom or a methyl group, and R⁷ independently represents a hydrogen atom or an alkyl group having 1 to 12 carbon atoms.

7. The dispersion liquid according to claim 6, wherein a content of the constituent unit D is 1 to 20 mol % with respect to a total amount of the dispersing resin.

8. The dispersion liquid according to claim 1, wherein the constituent unit A includes one or more selected from the group consisting of N-methanesulfonate maleimide, N-ethanesulfonate maleimide, N-propanesulfonate maleimide, N-benzenesulfonate maleimide, and salts thereof.

9. The dispersion liquid according to claim 1, wherein the polyalkyleneoxy group in the constituent unit B is a copolymer group of an ethyleneoxy group and a propyleneoxy group.

10. The dispersion liquid according to claim 1, wherein the constituent unit C includes one or more selected from the group consisting of styrene, allylbenzene, vinyltoluene, 1-vinylnaphthalene, and 2-vinylnaphthalene.

11. The dispersion liquid according to claim 1, wherein a weight average molecular weight of the dispersing resin is 10000 to 60000.

12. The dispersion liquid according to claim 1, wherein the coloring material is a disperse dye.

13. An ink composition for ink jet recording comprising:
the dispersion liquid according to claim 1;
a surfactant; and
a water-soluble organic solvent.

14. A dispersing resin comprising:
a constituent unit A represented by Formula (1);
a constituent unit B represented by Formula (2); and
a constituent unit C represented by any of Formulas (3-1) to (3-4), (1)

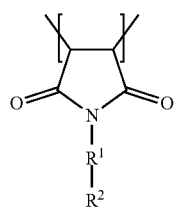

where R¹ independently represents a divalent organic group having 1 to 20 carbon atoms, and R² independently represents a sulfo group or a salt thereof, (2)

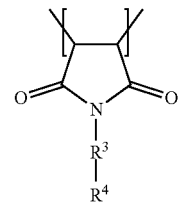

where R³ independently represents a polyalkyleneoxy group, and R⁴ independently represents an alkyl group having 1 to 3 carbon atoms, and (3-1)

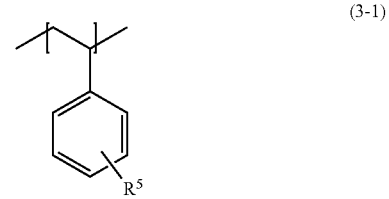

(3-2)

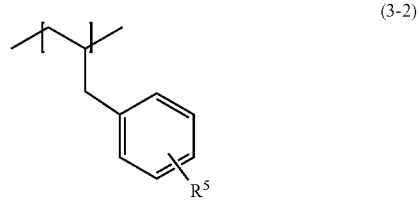

(3-3)

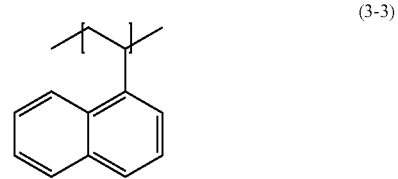

(3-4)

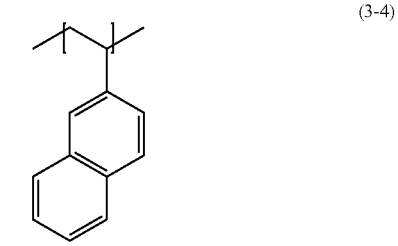

where R⁵ independently represents a hydrogen atom, an alkyl group having 1 to 12 carbon atoms, or an alkoxy group having 1 to 12 carbon atoms.

* * * * *